May 15, 1945.  A. L. M. A. ROUY  2,376,277
ISOSTATIC BALANCING
Filed Feb. 6, 1942  6 Sheets-Sheet 5
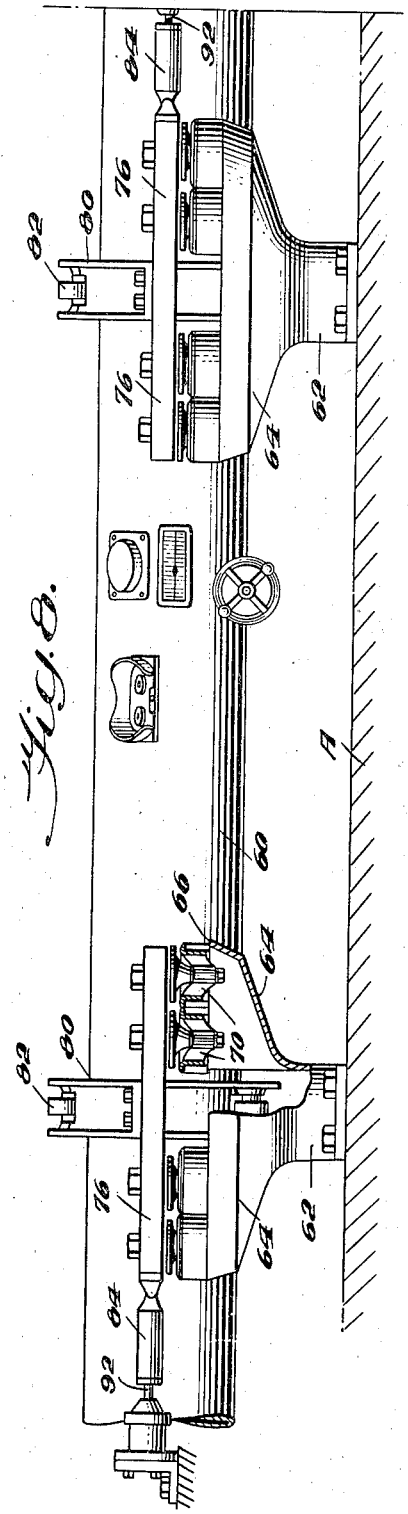
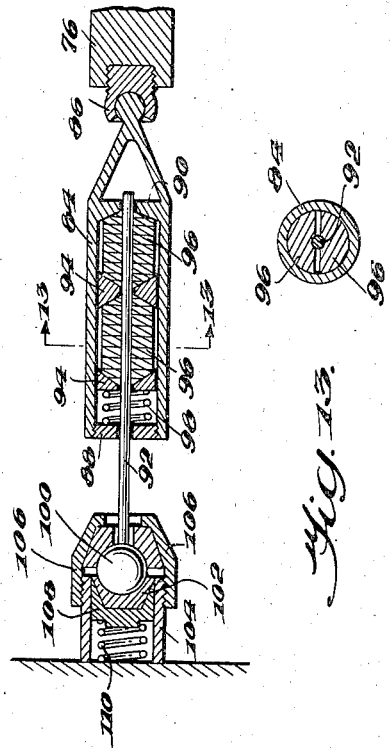
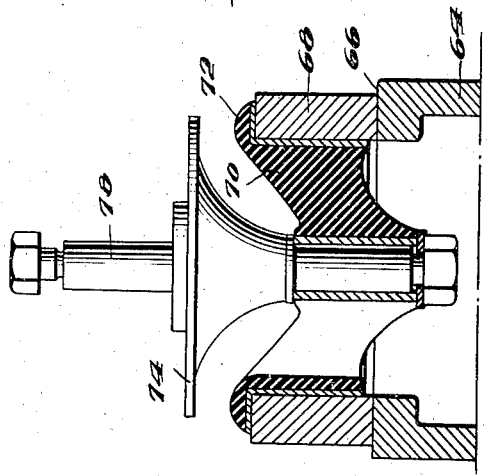
Inventor
AUGUSTE LOUIS MARIE ANTOINE ROUY,
By Bailey, Stephens & Huettig
Attorneys May 15, 1945.　　A. L. M. A. ROUY　　2,376,277
ISOSTATIC BALANCING
Filed Feb. 6, 1942　　6 Sheets-Sheet 6

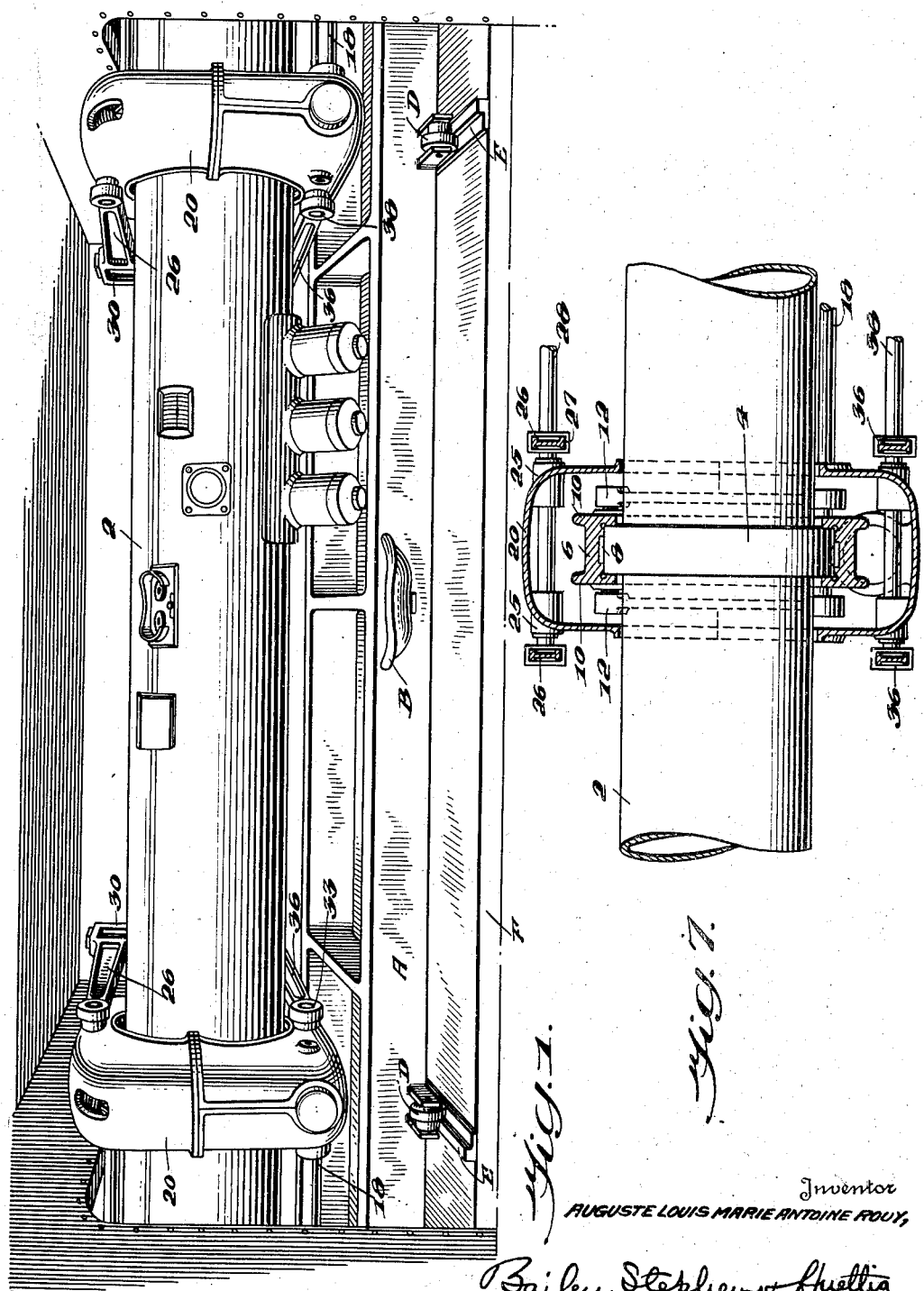

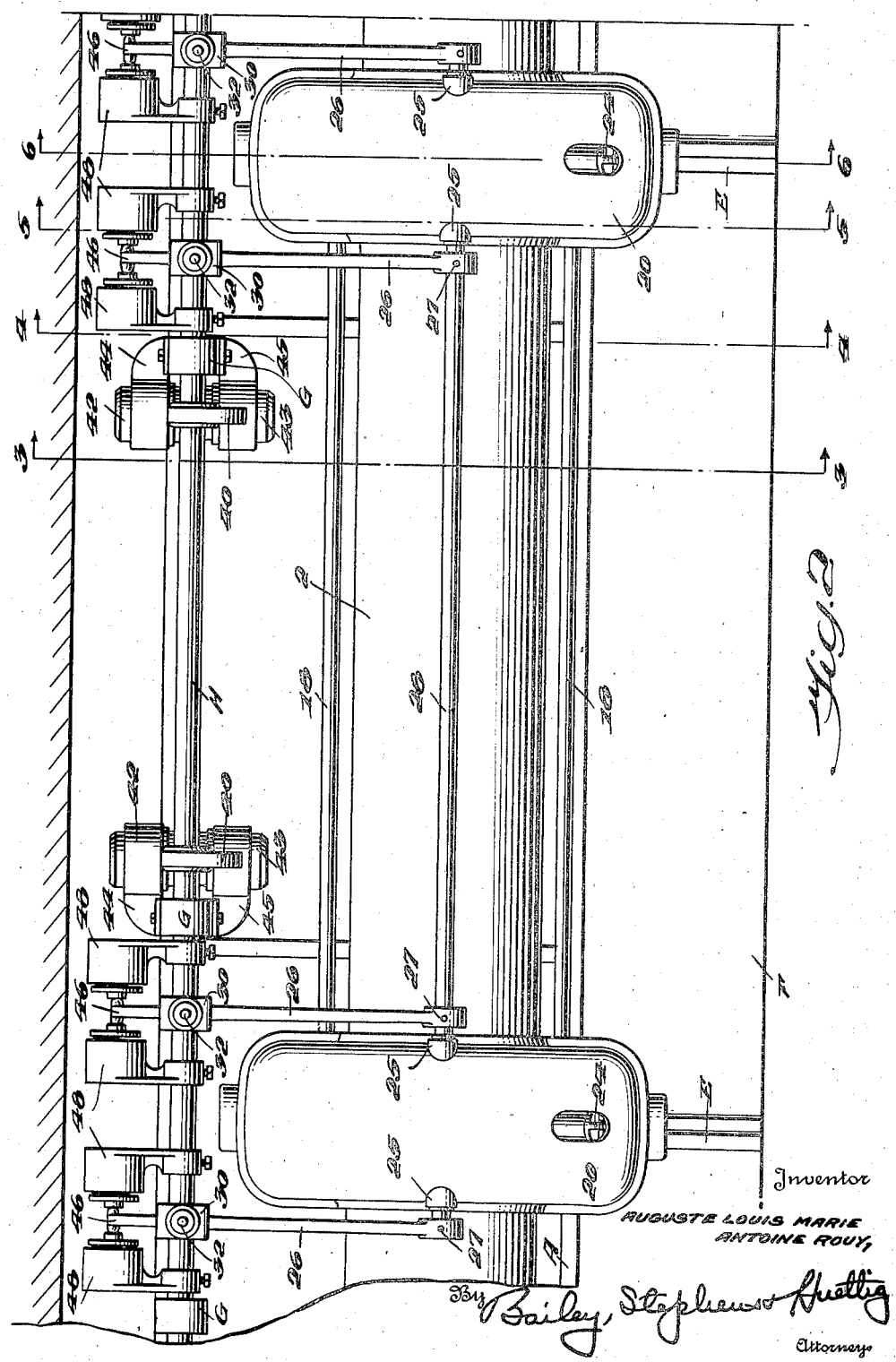

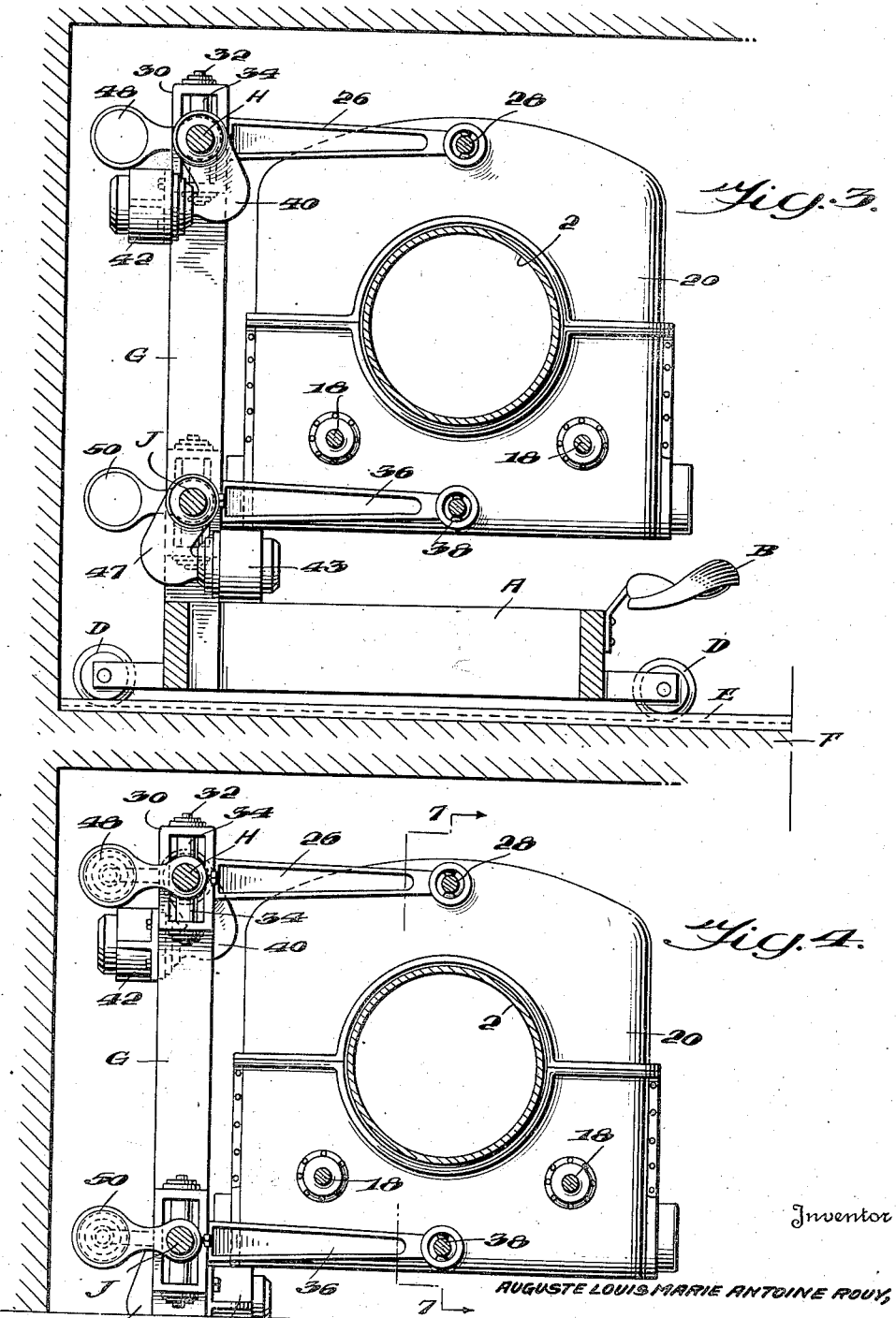

Inventor
AUGUSTE LOUIS MARIE ANTOINE ROUY,
By Bailey, Stephens & Huettig
Attorneys Patented May 15, 1945

2,376,277

UNITED STATES PATENT OFFICE 2,376,277

ISOSTATIC BALANCING

Auguste Louis Marie Antoine Rouy, New York, N. Y., assignor to Gyro-Balance Corporation, Greenwich, Conn., a corporation of Delaware Application February 6, 1942, Serial No. 429,838

20 Claims. (Cl. 248—358)

This invention is directed to the suspension of a beam so that it is protected from harmful vibrations. In particular the invention relates to the mounting of a range finder so that it is movable on three axes, with these movements controlled in such a manner that vibrations harmful to the structure and to the use of the range finder are prevented.

It is at times either desirable or necessary to mount a beam so that it is protected from vibrations occurring in the structure upon which it is mounted. An object of the invention is to provide such a mounting in a simple and effective manner.

Another object of the invention is to mount a beam so that it may oscillate, at a predetermined period only, along three orthogonal axes.

Another object of the invention is to mount a beam so that its normal period of oscillation is greater than the greatest period of harmful oscillations which may be transferred thereto.

Another object of the invention is to mount a beam for oscillation on three orthogonal axes in such a manner that up to the resonant frequency of the beam with respect to the support, the oscillations of the beam are greatly damped, and when the frequency of the support vibrations become greater than 1.414 the resonant frequency of the beam, the beam is substantially undamped.

Another object of the invention is to mount a beam so that its movement along three orthogonal axes is damped when the amplitude of vibration is less than 0.1 mm.

Another object of the invention is to mount a beam so that it is movable in response to the vibrations of a supporting structure, parallel to, but non-rotatable about, three orthogonal axes.

Another object of the invention is to mount a range finder so that any oscillations or vibrations occurring therein will not interfere with its use.

These and other objects of the invention are obtained by the structures shown in the accompanying drawings in which:

Fig. 1 is a front perspective view of a portion of a range finder mounted according to this invention; certain of the longitudinal shafts being omitted for the sake of clearness;

Fig. 2 is a plan view of the left side portion of the range finder of Fig. 1, and further showing the mounting means out of view on the left side of Fig. 1;

Fig. 3 is a cross-sectional view on the line 3—3, Fig. 2;

Fig. 4 is a cross-sectional view on the line 4—4, Fig. 2;

Fig. 7 is a cross-sectional view on the line 7—7, Fig. 4;

Fig. 8 is a side elevational view of a portion of a modified type of range finder mounting;

Fig. 11 is an enlarged cross-sectional view of one of the elastic bearings used in the modified structure of Fig. 8;

Fig. 12 is an enlarged cross-sectional view of a dampening device used in the mounting of Fig. 8; and Fig. 13 is a cross-sectional view along the line 13—13, Fig. 12.

When it is necessary to insulate a beam or elongated article from vibrations transmitted thereto from its supporting structure, very complex problems arise. The problems are solved by the instant invention in that movement of the beam is restricted to lines parallel to three orthogonal axes, and rotation of the beam about these axes is prevented. At the same time suitable dampening devices are provided so that any vibration transmitted to the beam is either entirely damped, or kept within such frequencies and amplitudes as not to interfere with the utility of the beam in its performance of whatever functions are required of it.

The problems of vibration control are especially critical in the case of range finders, which are usually mounted on vibrating structures such as ships, tanks or field pieces. The vibrations produced from vehicle motion, gun firings either individual or salvos, the operators motions, and from other causes must be controlled in order that a sharp image can always be viewed through the range finder.

For example, a range finder is essentially a steel tube from one yard to twenty-four yards long and containing various optical lenses and prisms. The transverse flexibility of the tube is controlled by giving the tube an adequate diameter and wall thickness, but this creates a tube with substantially no natural damping qualities, and with a rather high resonant frequency of vibration, this being for long tubes of the order of thirty to forty cycles per second, and being in certain short tubes up to sixty cycles per second.

Figure 5:
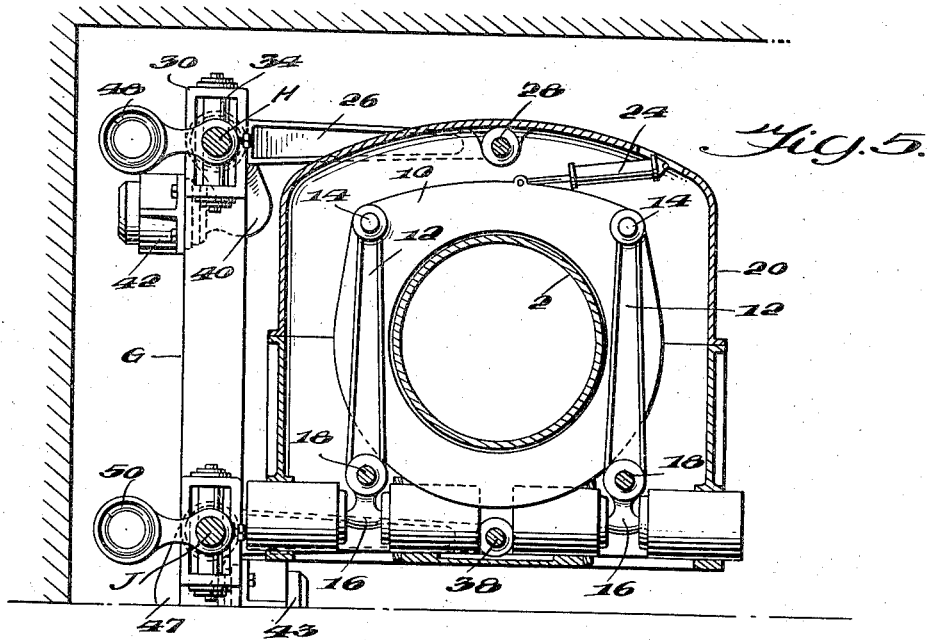
Fig. 5 is a cross-sectional view on the line 5—5, Fig. 2.
Figure 6:
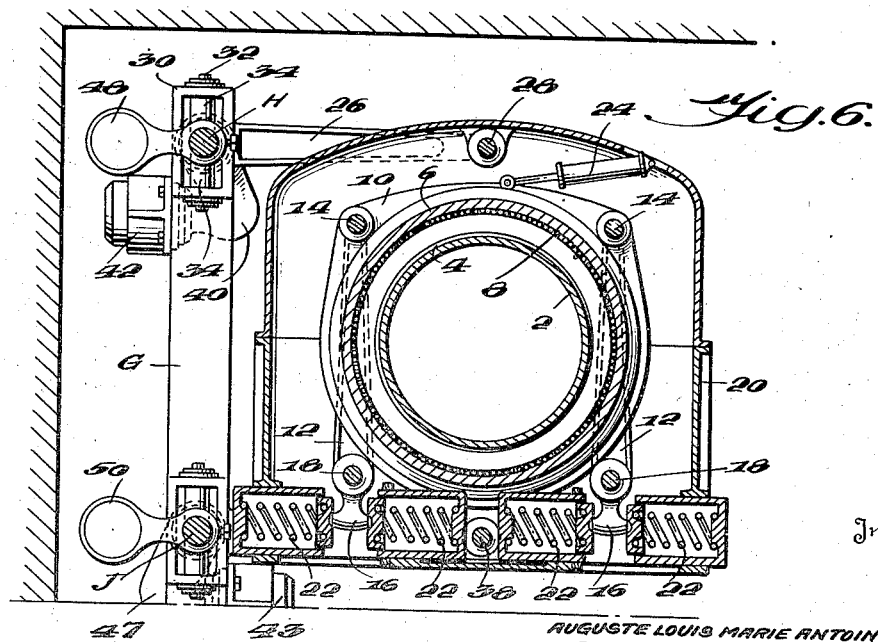
Fig. 6 is a cross-sectional view on the line 6—6, Fig. 2.

In Figs. 1 to 7, a range finder is mounted in such a way that the vibrations transmitted thereto can move the beam parallel to three orthogonal axes, and this movement is controlled by springs and frictional damping devices so that vibrations of low frequencies and high amplitudes are damped, while vibrations of high frequencies and small amplitudes are undamped. The mounting is designed to give the range finder a natural oscillation frequency of about two cycles per second, which is less than the normal oscillation rate of four cycles per second of the human body, particularly the head. In other words, the oscillation rate is low enough to allow the operator to sight through the eye pieces without disturbing the instrument, and the head of the operator can follow the eye piece without shock or fatigue. At the same time, rotation of the tube about the axes, which would produce a blurred image, and displacements of large amplitude, which would prevent the image from being centered on the cross-hairs, are prevented.

In Fig. 1 a cradle A, carrying an observers seat B, is movably mounted by rollers D upon a circular track E on base F. Supports G, Figs. 2 to 6, extend vertically from the rear side of cradle A. Shafts H and J extend between these supports G, and the range finder is hung from these shafts in a manner to be described presently. The structure thus described may be designated as the main supporting frame for the article.

The tube or beam 2 constituting the range finder is supported at a plurality of points by bearings, coupled in pairs. These pairs of bearings are symmetrically located on opposite sides of the center of the range finder. In Fig. 2 a pair of the bearings is illustrated, the right hand bearing appearing on the left side of Fig. 1. Each bearing is constructed as follows, note Figs. 6 and 7: A collar 4 fixed to tube 2 is rotatably set within an annulus 6, anti-friction needle rollers 8 being interposed therebetween if desired. Annulus 6 is faced with end plates 10. Four arms 12 are pivotally secured at 14 to the four upper corners of plates 10, these arms terminating below tube 2 in an inverted T-head 16. Immediately above heads 16, arms 12 are fixed to shafts 18, which are rotatably mounted in, and extend through housing 20. At this point it is noted from Fig. 2 that shafts 18 extend between and in effect connect the housings 20 in each pair of housings to each other.

The opening in housing 20 through which tube 2 passes, is of greater diameter than tube 2. Consequently tube 2 can move with respect to housing 20, but because of the parallelogram formed by the pairs of arms 12 on opposite sides of tube 2, this movement is restricted to displacement of the longitudinal axis of tube 2 parallel to itself in a substantially horizontal plane. The adherence to parallelism is further insured by the shafts 18 connecting pairs of housings 20 as the rotation of the shaft by the arms in one housing will cause displacement of the arms and supported tube portion in the connected housing.

Heads 16 on the lower ends of arms 12, are elastically restrained by pairs of oppositely disposed springs 22, mounted in spring boxes carried by housing 20. Springs 22 are for the purpose of centering arms 12, and for giving the tube a predetermined frequency of oscillation. To prevent it from acquiring large amplitudes through resonance at this frequency, brakes as indicated at 24, joined between plates 10 and housing 20, may be used. Conventional types of hydraulic, mechanical or electrical brakes are suitable, a particular form of friction brake being more fully described with reference to Figs. 12 and 13.

On opposite sides of the upper portion of each housing 20, note Fig. 2, are a pair of arms 26 fixed by pivot pin joints 27, to a shaft 28 which extends between a pair of housings, and is journaled at 25 in each housing 20.

The other end of each arm 26 terminates in a bracket 30 fixed to shaft H by means of pin 32 and swivel block 34. Arms 26 are therefore movable in a vertical plane and such motion will rotate shaft H on its longitudinal axis because of pin 32. A simultaneous rotation of shaft 28 also takes place. At the same time arms 26, by reason of the swivel blocks 34 and pivot joint 27 can move in a horizontal plane substantially in the direction of the longitudinal axis of tube 2.

Arms 36 similarly join the lower sides of housing 20 to shaft J, a shaft 38 extending between pairs of housings 20. It is thus apparent that arms 26, 36, together with shafts H and J, and shafts 28, 38, form systems of parallelograms through which housings 20, carrying tube 2, are hung from supports G, with tube 2 being movable parallel to itself in a vertical plane, and movable in the direction of its horizontal axis parallel thereto.

Fastened to shaft H are cranks 40, the lower ends of which engage springs mounted in boxes 42 fastened by elbows 44 to supports G. The spring arrangement is essentially the same as the spring 22 and the mounting therefor. Arms 26 are thus vertically movable against the elasticity of the springs in boxes 42.

Spring boxes 43 secured by elbows 45 to supports G, are engaged by cranks 47 fastened upon shaft J. Thus spring boxes 42 and 43 form in effect a pair of oppositely disposed means for centering arms 26 and 36 after up and down vertical movements of the arms. It is clear that the number of spring boxes need not be limited to the two pair shown, but can be varied in accordance with the frequency of oscillation required of any particular circumstance.

Elastic control of the movement of the arms 26 in the direction of the longitudinal axis of tube 2 is achieved by providing the free ends of arms 26 with T-shaped heads 46 which engage oppositely disposed pairs of spring boxes 48 fastened to shaft H. Spring boxes 48 are substantially similar to the springs 22 and the housing therefor. Arms 36 are likewise controlled by the spring boxes 50 mounted on shaft J.

As has been previously indicated, each of the springs is of predetermined elasticity with respect to the mass of the range finder. Brakes or damping devices, such as indicated at 24, are included along each axis so that vibrations of the range finder along the three orthogonal axes are damped for low frequencies of high amplitude, and undamped for high frequencies of small amplitude. Calculations have shown that no damping is necessary when the period of vibration is more than 1.414 the natural resonance frequency of the range finder. As rotation or twisting of the tube 2 is prevented by the hanger systems of parallelgrams, and as the vibrations are held below four oscillations per second, the range finder can be continually used without image distortion despite the firing of salvos, ship or vehicle movements, and other operating disturbances. Another feature of the parallelogram mounting is its compactness, which enables it to be substituted for the mountings conventionally used for range finders.

In the broad aspects of the invention as covered by certain of the claims, either of the housings 20, or both of them considered together with their connecting rods or shafts 18, 28 and 38, may be designated as an auxiliary supporting member. Such auxiliary supporting member will be understood to be operatively disposed intermediate the structure which has been referred to as the main supporting frame, and the beam-like article to be ultimately suspended in accordance with the invention.

Figure 9:
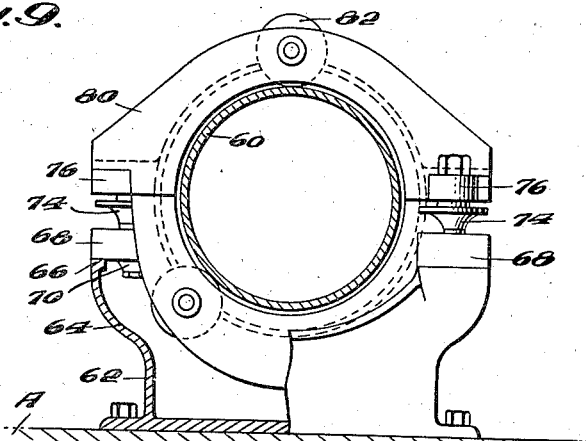
Fig. 9 is a cross-sectional view through the modified mounting on the line 9—9, Fig. 10.
Figure 10:
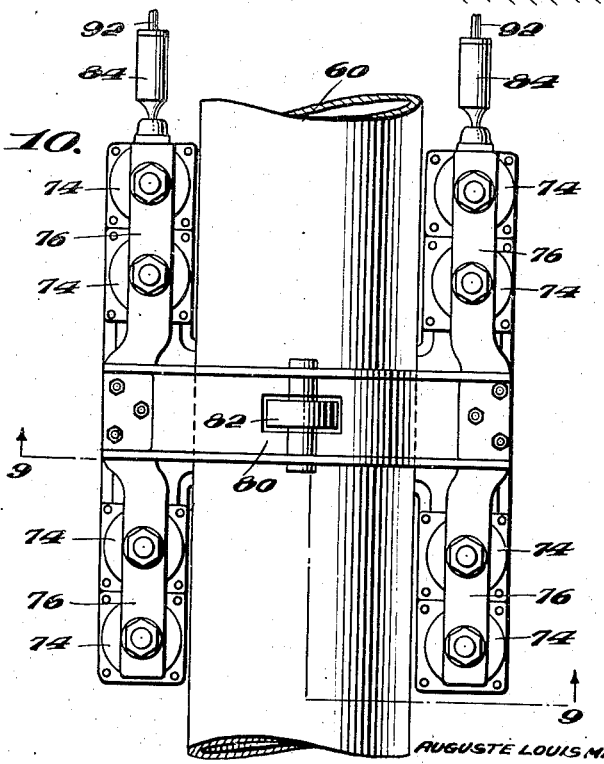
Fig. 10 is a plan view of the mounting shown on the right side of Fig. 8.

In Figs. 8 to 13, a modified mounting for the range finder tube 60 is disclosed. The tube is carried by a plurality of similar standards 62 bolted to cradle A. Each standard is Y-shaped in side elevational view, Fig. 8, and is separated transversely to form a yoke into which tube 60 extends, Fig. 9. Each arm 64 is hollowed so that it has a U-shaped upper edge 66. Mounted on this upper edge is a collar 68 which has a plurality of elastic discs 70, for example rubber discs, or rubber-like material such as Isodyne secured therein, the upper edge 72 of each disc being carried over the upper edge of collar 68. Each disc 70 has a member 74 bolted through the center of the disc. A bar 76 extends across all the discs 70 on each side of cradle 62, and is bolted to the shanks 78 projecting upwardly through bar 76. An annulus 80 is fastened to the bars 76, and tube 60 is rotatably mounted in the annulus 80, the tube resting on rollers 82 journaled to the annulus.

Tube 60 is thus carried by annulus 80 and bar 76 upon the elastic discs 70, and tube 60 is therefore movable relative to cradle A along three orthogonal axes. The elasticity of discs 70 is selected, as in the case of the springs described for Figs. 1 to 7.

For damping vibrations of high amplitude and low frequency, the device of Fig. 12 has been found to be particularly effective. This consists of a cylinder 84 fastened by a ball and socket joint 86 to bar 76. One end of the cylinder is closed by a plug 88 having a hole through the center thereof, and the opposite end of the cylinder is closed by a wall 90 having a hole therethrough and a conical surface facing toward the interior of the cylinder. A rod 92 of less diameter than the holes in the ends of the cylinder, passes through the holes longitudinally of the cylinder. Mounted within the cylinder are a plurality of metal wedge blocks 94 separated from each other by semi-annular wooden members 96. Spring 98 urges wedge blocks 94 and wooden members 96 into engagement with each other, and causes the wooden ring halves 96 to engage rod 92. This construction produces a substantially constant coefficient of friction between rod 92 and the wooden members 96. The outer end of rod 92 terminates in a ball 100 mounted in a wooden socket 102, the ball and socket being housed in a cylinder 104 closed by a cap 106. Socket 102 is seated in a receptacle 108 in the cylinder 104 and is resiliently pressed toward ball 100 by spring 110. Cylinder 104 is secured to some relatively stationary support.

Because of ball and socket joints 86 and 100, 102, the device is responsive to movements of the bar 76, and thus tube 60, along three orthogonal axes. As cylinder 84, Fig. 12, moves to the right or to the left wedge blocks 94, urged by spring 98, hold members 96 in frictional contact with rod 92, thus restraining relative movement therebetween. The assemblage of the wooden members 96 is inherently loose enough so that vibrations of low amplitude are not damped. Additional damping is achieved by virtue of the work produced in rotating ball 100 against the pressure of spring 110. Because of the oppositely disposed cylinders as shown on the right and left sides of Fig. 8, symmetrical damping forces are produced.

Having now described the means by which the objects of the invention are obtained, I claim:

1. A support for a beam comprising means resiliently mounting said beam for movement only along three orthogonal axes, and means for damping the oscillations of said beam along each of said axes.

2. A vibration damping support for a beam comprising means mounting said beam for movement only along three orthogonal axes, means for holding said beam parallel to its original position as it moves along said axes, and means for damping the vibrations of said beam along said axes.

3. A support for a beam comprising a pair of hangers, said beam resting in said hangers, and means mounting said hangers in three systems of parallelograms whereby movement of said beam is limited to directions parallel to itself along three orthogonal axes.

4. A mounting for a range finder tube comprising means mounting said tube for oscillatory movement along three orthogonal axes and means associated with said mounting means for limiting such movement to a normal oscillatory rate of approximately two cycles per second.

5. A resilient mounting for a beam comprising a pair of housings, means mounting said beam in said housings for relative movement along one of three orthogonal axes, and means for supporting said housings for movement along the two other of said three orthogonal axes.

6. A resilient mounting for a beam comprising a plurality of housings, means mounting said beam in said housings for relative movement along one of three orthogonal axes, and means for supporting said housings for movement along the two other of said three orthogonal axes.

7. A resilient mounting as in claim 6 further comprising means for elastically controlling the movements of said beam and housings along said axes.

8. A resilient mounting as in claim 6 further comprising arms interconnecting said housings into three sets of parallelograms whereby rotation of said beam about said axes is prevented.

9. A mounting for a range finder comprising a pair of vertical supports, a pair of vertically separated shafts journaled in said supports, a pair of housings adapted to carry a range finder tube, a first pair of arms for each housing, means joining one arm for each housing to the uppermost of said shafts and to the housing for rotation with said shaft and pivotally displaceable with respect thereto, means similarly joining the other arm of said pair of arms to the lowermost of said shafts and to said housing, a bearing for said tube within each housing, second pairs of arms pivotally joining each bearing to its respective housing for relative movement with respect thereto, and spring means for opposing movements of said arms and shafts.

10. A mounting for a range finder comprising a pair of vertical supports, a pair of vertically separated shafts journaled in said supports, a plurality of housings adapted to carry a range finder tube, a first pair of arms for each housing, means joining one arm for each housing to the uppermost of said shafts and to the housing for rotation with said shaft and pivotally displaceable with respect thereto, means similarly joining the other arm of said pair of arms to the lowermost of said shafts and to said housing, a bearing for said tube within each housing, second pairs of arms pivotally joining each bearing to its respective housing for relative movement with respect thereto, and resilient means for opposing movements of said arms and shafts.

11. A mounting as in claim 10, a second pair of shafts journaled in each of said housings and extending parallel to said vertically separated shafts, and said joining means including transverse pivot means joining said first pair of arms to said second shafts, respectively.

12. A mounting as in claim 10, a second pair of shafts journaled in each of said housings and extending parallel to said vertically separated shafts, said joining means including transverse pivot means joining said first pair of arms to said second shafts, respectively, and a third pair of shafts journaled in said housings and extending therebetween, said second pair of arms being secured to said third shafts to form the pivotal joint between said second arms and said housing.

13. In a range finder mounting, means for supporting the range finder tube for movement only along three orthogonal axes, and means for damping oscillations of said supporting means when said oscillations are less than 1.414 the normal resonant frequency of the range finder.

14. In a vibration damping support for a beam, means mounting said beam for movement only along three orthogonal axes, and means for holding said beam parallel to its original position as it moves along said axes.

15. A mounting for a range finder or similar elongated beam-like article, which comprises, in combination, a main supporting frame, an auxiliary supporting member, means connecting said auxiliary supporting member to said main supporting frame for movement of said member in two orthogonal planes, and means connecting said article to said auxiliary supporting member for movement with respect to said member in a third plane at right angles to both of said first named planes; said first named connecting means comprising a pair of arms having their corresponding ends pivotally connected with said supporting frame for swinging movement in one of said first named planes, and having their opposite corresponding ends pivotally connected with said auxiliary supporting member, and a pair of arms having their corresponding ends pivotally connected with said supporting frame for swinging movement in the other of said first named orthogonal planes and having their opposite corresponding ends pivotally connected with said auxiliary supporting member; and said second named connecting means comprising a pair of arms having their corresponding ends pivotally connected with said auxiliary supporting member for swinging movement in said third plane and having their opposite corresponding ends pivotally connected with said article; and resilient means for opposing movements of said article and said auxiliary supporting member.

16. A mounting for a range finder or similar elongated beam-like article, which comprises, in combination, a main supporting frame, an auxiliary supporting member, means connecting said auxiliary supporting member to said main supporting frame for movement of said member in two orthogonal planes, and means connecting said article to said auxiliary supporting member for movement with respect to said member in a third plane at right angles to both of said first named planes; said first named connecting means comprising a pair of parallel arms of equal length having their corresponding ends pivotally connected with said supporting frame for swinging movement in one of said first named planes, and having their opposite corresponding ends pivotally connected with said auxiliary supporting member, and a pair of parallel arms of equal length having their corresponding ends pivotally connected with said supporting frame for swinging movement in the other of said first named orthogonal planes and having their opposite corresponding ends pivotally connected with said auxiliary supporting member; and said second named connecting means comprising a pair of parallel arms of equal length having their corresponding ends pivotally connected with said auxiliary supporting member for swinging movement in said third plane and having their opposite corresponding ends pivotally connected with said article; and resilient means for opposing movements of said article and said auxiliary supporting member.

17. A mounting for a range finder or similar elongated beam-like article, which comprises, in combination, a main supporting frame, an auxiliary supporting member, means connecting said auxiliary supporting member to said main supporting frame for movement of said member in two orthogonal planes, and means connecting said article to said auxiliary supporting member for movement with respect to said member in a third plane at right angles to both of said first named planes; said first named connecting means comprising a pair of parallel arms of equal length having their corresponding ends pivotally connected with said supporting frame for swinging movement in one of said first named planes, and having their opposite corresponding ends pivotally connected with said auxiliary supporting member, and a pair of parallel arms of equal length having their corresponding ends pivotally connected with said supporting frame for swinging movement in the other of said first named orthogonal planes and having their opposite corresponding ends pivotally connected with said auxiliary supporting member; and said second named connecting means comprising a pair of parallel arms of equal length having their corresponding ends pivotally connected with said auxiliary supporting member for swinging movement in said third plane and having their opposite corresponding ends pivotally connected with said article; and resilient means associated with at least one arm of each of said pairs for opposing movements of said arms and consequently of said article and said auxiliary supporting member; and means for damping oscillations of said article in said planes of movement.

18. A mounting for a range finder or similar elongated beam-like article, which comprises, in combination, a main supporting frame, and an auxiliary supporting member, a pair of spaced parallel shafts rotatably carried by said frame, two pairs of parallel arms of equal length one arm of each of said pairs pivoted at one end to each of said shafts to swing in unison in a plane including the axis of said shaft but fixed for rotation along with said shaft, a pair of parallel shafts spaced apart the same distance that separates the first two shafts and each parallel to and equidistantly spaced from corresponding ones of said first pair, bearings for said second pair of shafts in said auxiliary supporting member, the opposite ends of said pairs of arms respectively connected to said second named shafts to pivot in a plane of the axis of said shafts but to swing with said shafts when they rotate relative to said bearings; a pair of parallel arms of equal length pivoted at corresponding ends on said auxiliary supporting member for swinging movement in a plane at right angles to the axes of said shafts, the opposite ends of said last named arms being pivotally connected with said article; all whereby said article is supported for bodily translatory movement in three orthogonal planes.

19. A mounting for a range finder or similar elongated beam-like article, which comprises, in combination, a main supporting frame, and an auxiliary supporting member, a pair of spaced parallel shafts rotatably carried by said frame, two pairs of parallel arms of equal length one arm of each of said pairs pivoted at one end to each of said shafts to swing in unison in a plane including the axis of said shaft but fixed for rotation along with said shaft, a pair of parallel shafts spaced apart the same distance that separates the first two shafts and each parallel to and equidistantly spaced from corresponding ones of said first pair, bearings for said second pair of shafts in said auxiliary supporting member, the opposite ends of said pairs of arms respectively connected to said second named shafts to pivot in a plane of the axis of said shafts but to swing with said shafts when they rotate relative to said bearings; a pair of parallel arms of equal length pivoted at corresponding ends on said auxiliary supporting member for swinging movement in a plane at right angles to the axes of said shafts, the opposite ends of said last named arms being pivotally connected with said article; all whereby said article is supported for bodily translatory movement in three orthogonal planes; and means resisting movement of said article in said planes, and means for damping oscillations of said article in all three planes of movement permitted by the supporting connections.

20. A resilient mounting for a range finder or similar elongated beam-like article comprising, in combination, a Y-shaped cradle, an annular bearing carrying said article, snugly fitted around the same, and movably supported relative to said cradle, resiliently deformable means between said bearing and said cradle for resiliently supporting the former, and means for restricting the amplitudes of oscillation of said bearing and those of said article.

AUGUSTE LOUIS MARIE ANTOINE ROUY.